United States Patent Office 3,026,205
Patented Mar. 20, 1962

3,026,205
PROCESS OF PRODUCING BAKED CONFECTIONS AND THE PRODUCTS RESULTING THEREFROM BY ALPHA AMYLASE
Irwin M. Stone, Staten Island, N.Y., assignor to Baxter Laboratories, Inc.
No Drawing. Filed Aug. 19, 1959, Ser. No. 834,670
8 Claims. (Cl. 99—92)

This invention relates to an improved baking process and to the baked products resulting therefrom. More particularly, it relates to a simplified one-stage baking process for the preparation of pies, cakes with icings and other novel baked confections.

Pies are customarily prepared by what is essentially a three-stage process. In the first stage the crust or shell is prepared. This operation includes preparing and rolling out pie dough, cutting and inserting this sheeted pie dough into the baking pan, and, in some instances separately baking the crust or shell. The second stage involves the preparation of the filling material. In the third and final stage the filling material is introduced into the baking pan, and the combination of shell and filling material is subjected to a final baking operation to complete the baking of the shell and to cook or set the filling material.

In the preparation of frosted or iced cakes by the conventional methods, a four-stage process is employed. The cake batter is first prepared and then baked. Either concurrently with or subsequent to this baking operation, the icing or frosting is prepared. After the cake has cooled the icing is applied to and spread over the surface of the cake.

According to the practices of this invention pie-type baked confections are prepared by methods which eliminate the separate preparation and handling of the crust and filling material. Only a single batter is required. This batter is of the type conventionally employed for the preparation of cakes. When the methods of this invention are practiced, such a batter is prepared and baked by the conventional cake making methods; but the resulting product has the characteristics of a pie rather than a cake. The consequent elimination of the crust making operation permits a substantial reduction in the time and labor which are normally required for the commercial or household production of baked goods. Furthermore, the processes of this invention permit an unskilled housewife to turn out a uniform, well prepared pie-type confection without the risk of failure.

The methods of this invention make it possible to completely eliminate one of the conventionally employed steps required for the preparation of frosted or iced cakes. In the practice of this invention, as it relates to the preparation of such cakes, two batters are prepared, one the regular cake batter and the other a batter which is treated according to the methods described hereinafter. The batters are layered in the baking pan, the treated batter being the layer adjacent to the surface of the baking pan. On baking, the treated batter becomes the icing or frosting, thus eliminating the often tedious and time consuming step of the separate application of the icing to the cake.

The methods of this invention have further advantages in that they permit the preparation of new types of baked goods which have heretofore been unknown to the baking art. Pudding cakes, cakes with sweet confection-like fillings and other unusual variations are easily prepared with these methods.

Because they are more resistant to staling, the novel baked confections of this invention are superior to the conventional type of baked confections which become stale quite quickly. Even after long periods of storage these novel baked confections remain as fresh as they were immediately after baking.

In the practice of this invention relatively large quantities of heat-stable alpha amylase are added to the conventional type of cake batter. Upon baking, there result completely new and novel pie-like baked confections or other novel baked goods. The heat-stable alpha amylase during baking and cooling, attacks and digests a portion of the starch in the crumb, thereby changing the crumb structure into a pudding-like mass. This pudding-like mass contains the flavoring and sugary constituents of the pie and corresponds to the conventional type of pie filling material. The quantity of heat-stable alpha amylase which is employed is such that the digestion of the starch takes place in the interior crumb structure of the confection with relatively little digestive action on the crust structure.

This invention may also be applied to the production of new types of crackers, and it also makes possible the elimination of some of the steps which are normally employed in the present manufacture of crackers. For instance, an iced cracker can be produced in a single baking operation by layering a sweetened, flavored, alpha amylase treated dough on the regular cracker dough before it enters the baking oven, thus baking right on the cracker, the icing component. Normally, the icing or filling of a cracker sandwich requires a separate manufacturing operational step.

The heat-stable alpha amylase employed in the methods of this invention is obtained from a variety of sources. An enzyme may be obtained, for example, from certain species of *Bacillus mesentericus* and *Bacillus subtilis*. Such enzymes are quite heat-resistant, showing their maximum activity in the preparations of this invention at temperatures of 80° C. A certain degree of activity is retained even at a temperature of 100° C., the boiling point of water. At higher temperatures the enzyme is rapidly and completely inactivated.

The action of the heat-stable alpha amylases in the preparations of this invention during baking is believed to be as follows. When placed in a heated oven the batter in the baking pan gradually rises in temperature. That portion of the batter in contact with the surface of the baking pan and the open upper surface layer of the batter reaches a higher temperature than does the inside crumb portion of the batter. As a consequence, at normal baking temperatures, the enzyme in the outer batter layers is much more quickly inactivated than is the enzyme in the inner crumb portion of the batter. Since the internal temperature of the product never exceeds 100° C. during baking, the enzyme remains active in the crumb structure during baking and during the subsequent cooling period. This results in a product which has a normal pie-type dry crust and a moist, sweet, pie-type filling.

The quantity of enzyme necessary to produce a satisfactory product is affected by a number of variables, among which are the following: oven temperature, baking time, the size and type of pan, the thickness of the batter, the recipe and the amount and type of flour which is employed and the type of baked confection which is desired. The quantity and thermal stability of the enzyme employed is such that the crust is not materially affected, i.e., crust inactivation takes place rapidly to produce a normal dry crust, whereas there is retained in the crumb sufficient alpha amylase activity to attack and convert the fine, bubbly, solid, crumb structure to a moist, sweet pudding-type consistency. Within the normal range of enzyme concentration, considerable leeway is possible, depending upon the many variables which are of importance in obtaining the desired result.

Although empirically the amounts of alpha amylase employed in this invention are small, such amounts are much greater than the amounts which have heretofore been employed in the baking arts. For example, U.S. Patent No. 2,615,810 describes and claims a method for retarding the staling of bakery products in which there is employed from 0.1 to 4 SKB alpha amylase units per 100 grams of flour in the dough. Such SKB units are assayed by the method of Sandstedt, Kneen and Blish, published in Cereal Chemistry, volume XVI, page 712 (1939). In the methods of the present invention there is employed an amount of heat-stable alpha amylase enzymatic preparation equivalent to from 10 to 200 SKB alpha amylase units per 100 grams of flour in the dough. In the preferred methods, the heat-stable alpha amylase is present in amounts equivalent to from 15 to 50 SKB alpha amylase units per 100 grams of flour.

The examples set forth below will illustrate typical forms of this invention. In general, when a pie-type confection is baked according to the methods of this invention, less leavening material is employed than is customary, in order to avoid products with high sided crusts and depressed centers. The typical procedure for producing a pie-type confection by these methods is to employ the usual cake-making procedures for the preparation of the batter which contains the alpha amylase. The prepared batter is then placed in pans and baked according to conventional techniques. During the baking and cooling period the enzyme digests the internal crumb structure and produces the pudding or pie-type effect. No mechanical operations or extra handling are required, as this pie-type effect is obtained automatically, after the baked confection has cooled.

A more comprehensive understanding of this invention is obtained by reference to the following detailed examples:

EXAMPLE I

*Chocolate Pie*

| | |
|---|---|
| Flour | 2½ cups. |
| Sugar | 2¾ cups. |
| Shortening | ⅔ cup. |
| Eggs | 3. |
| Cocoa | ⅔ cup. |
| Soda | 1 teaspoon. |
| Salt | Do. |
| Vanilla | Do. |
| Water | 1⅓ cups. |
| Bacterial alpha amylase | 50 SKB units per 100 grams of flour. |

The batter is prepared by creaming, until fluffy, the shortening, sugar and eggs. This creamed mixture is beaten for five minutes with a high speed mixer. The sifted dry ingredients are then added alternately with the water and vanilla, the addition being accompanied by low speed mixing. The batter is then poured into the baking pan and baked at 350° F. for about 40 minutes. A novel chocolate pie results after the baked material cools.

EXAMPLE II

*Nut and Fruit Baked Confection*

The following ingredients are sifted into a mixing bowl: two cups of cake flour, 1½ cups of sugar, 1½ teaspoons of soda, 1½ teaspoons of salt, 2 tablespoons of cocoa, ½ teaspoon each of cinnamon, cloves, nutmeg and allspice. To this dry mixture are added ½ cup of shortening and 1½ cups of applesauce. The resulting product is beaten for 2 minutes, 2 eggs are added, and the beating is continued until the batter is smooth. There are then stirred into the batter ¾ cup each of cut-up dates, chopped raisins and chopped nuts and ½ cup diced citron. To the batter are added 25 SKB units of heat-stable alpha amylase per 100 grams of flour. The mixture is placed in pans and baked for 45 minutes at 350° F. This produces a moist, fruit and nut confection which retains its moist-freshness for long periods of time.

EXAMPLE III

*Pecan Pie*

A pecan pie-type baked confection is prepared as follows: A commercial dry cake mix, "Betty Crocker's Black Walnut Cake Mix" is obtainable in the open market. To 570 grams (1 commercially available package) there is added bacterial alpha amylase to the extent of 20 SKB alpha units per 100 grams of the dry mix. The batter is prepared in the normal manner, following the directions on the package. After preparation of the batter, 6 ozs. of shelled pecan halves are added to the batter which is then panned and baked for 28 minutes in an oven at 350° F. After cooling, a pecan pie results instead of the cake which would have been formed had the alpha amylase been omitted.

EXAMPLE IV

*Marble Filled Cake*

WHITE CAKE PLUS MARBLING OF ALPHA TREATED CHOCOLATE CAKE

A batter is prepared from a conventional commercially obtainable white cake mix or recipe. A chocolate cake batter containing about 30 units of heat-stable alpha amylase per 100 grams of flour is then separately prepared. The recipe in Example I may be used for the preparation of this chocolate batter by increasing the sugar to 3¾ cups and decreasing the alpha amylase units to 30 SKB units per 100 grams of flour. The white cake batter is placed in a pan and the chocolate batter poured over the top surface. The batter is marbleized by gently cutting and slightly mixing the chocolate batter with the white cake batter immediately prior to baking. After baking and cooling the white cake will be marbleized by a sweet, moist chocolate baked confection.

EXAMPLE V

*Pineapple Pie Cake*

This baked confection is prepared from a commercially available dry cake mix as follows: a package of Pillsbury Pineapple Cake Mix, as commonly available in grocery stores, is used. Bacterial alpha amylase to the extent of 15 SKB alpha units per 100 grams of dry mix is added during preparation of the batter. The batter is prepared according to the directions on the package and the baking directions are similarly used. After baking for 30 minutes in a 350° F. oven and subsequent cooling, a novel pineapple pie-like baked confection is obtained.

EXAMPLE VI

*Coconut Pie*

To about 1 lb. of a conventional commercially obtainable white cake mix there are added about 4 ounces of shredded coconut and 25 SKB units of heat-stable, alpha amylase per 100 grams of flour. After preparation of the batter, the batter is poured into pie tins and baked in the usual manner. After baking and cooling, a coconut pie results from the action of the enzyme on the crumb structure formed by the action of the heat on the batter.

EXAMPLE VII

*Peach Pie*

Fruit pies may be prepared by using a conventional white cake mix batter in which the water content has been reduced in proportion to the amount of fresh fruit expected to be added. The amount of heat-stable bacterial amylase required for the preparation of these one-stage fruit pies is generally low, in the neighborhood of 10 SKB unit of heat-stable alpha amylase or less per 100 grams of flour. For instance, for the preparation of a peach pie the following recipe may be employed: a commercially available package of Betty Crocker's White Cake Mix, as normally sold to the housewife, is used to prepare the batter. Only about 40% of the water called for in the recipe is used. Six SKB units of heat-stable alpha amylase per 100 grams of flour are added during the preparation of the batter. To the batter there is added an equal weight of drained, sliced peaches. These ingredients are thoroughly incorporated in the batter which is then placed in a baking tin and baked for 22 minutes at 400–425° F.

EXAMPLE VIII

For the preparation of a unique sweet coated or iced cracker the following procedure may be used: two doughs are prepared; one the regular cracker base dough and two, the icing component. This is a regular type of cracker dough except that the sugar component is increased and the dough is flavored with a suitable flavoring ingredient, such as chocolate or other distinctively flavored components. Included in this dough is the heat-stable alpha amylase in a quantity sufficient to react during and after baking to produce a soft saccharin layer on the cracker base. Thus, through the use of this enzyme treatment, it is possible in a single baking operation to form filled or coated crackers, thereby completely eliminating the otherwise requisite conventional icing procedure.

The above examples are to be considered only as illustrative of the products and processes of this invention and are not to be construed as limiting the scope of the invention.

What is claimed is:

1. The process of making baked confections which comprises incorporating in a batter a heat-stable alpha amylase enzymatic preparation in amounts equivalent to from 10 to 200 SKB alpha amylase units per 100 grams of flour in the batter, said enzymatic preparation being present in such quantity and being of such thermal stability that effective amounts of alpha amylase are present and active in the crumb at temperatures above the starch digestion point to reduce the normal crumb structure to a pudding like mass and thereafter baking the batter.

2. The process of making baked confections which comprises incorporating in a batter a member of the group consisting of heat-stable bacterial alpha amylase enzymatic preparations derived from *Bacillus mesentericus* and *Bacillus subtilis* in amounts equivalent to from 10 to 200 SKB alpha amylase units per 100 grams of flour in the batter, said enzymatic preparation being present in such quanity and being of such thermal stability that effective amounts of alpha amylase are present and active in the crumb at temperatures above the starch digestion point to reduce the normal crumb structure to a pudding like mass and thereafter baking the batter.

3. The process of making baked confections which comprises incorporating in a batter a heat-stable alpha amylase enzymatic preparation in amounts equivalent to from 15 to 50 SKB alpha amylase units per 100 grams of flour in the batter, said enzymatic preparation being present in such quantity and being of such thermal stability that effective amounts of alpha amylase are present and active in the crumb at temperatures above the starch digestion point to reduce the normal crumb structure to a pudding like mass and thereafter baking the batter.

4. The process of making baked confections which comprises incorporating in a batter a member of the group consisting of heat-stable bacterial alpha amylase enzymatic preparations derived from *Bacillus mesentericus* and *Bacillus subtilis* in amounts equivalent to from 15 to 50 SKB aplha amylase units per 100 grams of flour in the batter, said enzymatic preparation being present in such quantity and being of such thermal stability that effective amounts of alpha amylase are present and active in the crumb at temperatures above the starch digestion point to reduce the normal crumb structure to a pudding like mass and thereafter baking the batter.

5. In the process of making baked confections which comprises incorporating into a batter an alpha amylase preparation in amounts equivalent to from 6 to about 200 SKB alpha amylase units per 100 grams of flour in the batter, said alpha amylase being of such thermal activity that effective amounts of alpha amylase are present and active in the crumb at temperatures above the starch digestion point to reduce the normal crumb structure to a pudding like mass and thereafter baking the batter.

6. A dry confection mix comprising flour and alpha amylase in an amount equivalent to from 6 to 200 SKB unit per 100 grams of flour, said alpha amylase being of such thermal stability that effective amounts are active above the starch gelatinization point to reduce the crumb structure to a pudding-like mass.

7. A dry baking mix comprising flour, sugar and shortening and alpha amylase enzyme in amounts equivalent to 6 to 200 SKB units per 100 grams of flour, said alpha amylase being of such thermal stability that effective amounts are active above the starch gelatinization point to reduce the crumb structure to a pudding-like mass.

8. A dry baking mix comprising flour, sugar and shortening and an alpha amylase enzyme preparation derived from a member selected from the class *Bacillus mesentericus* and *Bacillus subtilis* in an amount equivalent to 6 to 200 SKB units per 100 grams of flour, said alpha amylase being of such thermal stability that effective amounts are active above the starch gelatinization point to reduce the crumb structure to a pudding-like mass.

References Cited in the file of this patent

UNITED STATES PATENTS 2,615,810    Stone _____ Oct. 28, 1952